US005615076A

United States Patent [19]
Slepian et al.

[11] Patent Number: 5,615,076
[45] Date of Patent: Mar. 25, 1997

[54] APPARATUS FOR PROTECTING ELECTRONIC DEVICES AND ASSOCIATED METHODS OF MANUFACTURING

[75] Inventors: Harvey Slepian, Peoria; Loran Sutton, East Peoria, both of Ill.

[73] Assignee: TAS Distributing Co., Inc., Peoria, Ill.

[21] Appl. No.: 500,506

[22] Filed: Jul. 11, 1995

[51] Int. Cl.$^6$ ............................................. H02H 3/20
[52] U.S. Cl. ................................. 361/90; 361/115
[58] Field of Search ....................... 361/90, 92, 71, 361/72, 115, 94; 320/13, 48; 307/10.1; 324/107

[56] References Cited

U.S. PATENT DOCUMENTS

| | | | |
|---|---|---|---|
| 4,255,697 | 3/1981 | Buhler, III | 320/6 |
| 4,385,240 | 5/1983 | Sato | 307/10 R |
| 4,733,100 | 3/1988 | Nusairat et al. | 307/9 |
| 4,964,011 | 10/1990 | Sternglass | 361/88 |
| 5,170,151 | 12/1992 | Hochstein | 340/636 |
| 5,204,991 | 4/1993 | Law | 307/10.7 |
| 5,221,861 | 6/1993 | Kinsell | 307/9.1 |
| 5,327,068 | 7/1994 | Lendrum et al. | 320/13 |
| 5,381,295 | 1/1995 | Rund | 361/92 |

*Primary Examiner*—Jeffrey A. Gaffin
*Assistant Examiner*—Stephen Jackson
*Attorney, Agent, or Firm*—Michael S. Bush

[57] ABSTRACT

An electronic device protecting apparatus and associated methods of manufacturing provide protection for electronic devices which receive power for their operation at least in part from a storage battery. In a preferred embodiment, an electronic device protecting apparatus has a battery voltage sensor, an engine start sensor, and an electronic device decoupler. The electronic devices are decoupled from the battery when the battery voltage drops below a predetermined level, and when the engine is being started.

21 Claims, 2 Drawing Sheets

APPARATUS FOR PROTECTING ELECTRONIC DEVICES AND ASSOCIATED METHODS OF MANUFACTURING

BACKGROUND OF THE INVENTION

The present invention relates generally to the protection of electronic devices from voltage spikes and, in a preferred embodiment thereof, more particularly provides apparatus for protecting electronic devices which are powered by a vehicle's electrical system.

Quite frequently, electronic devices are installed in a vehicle by the vehicle's owner. These electronic devices may include radar detectors, stereo radios, tape decks, compact disk players, citizens band radios, cellular telephones, televisions, satellite receivers, etc. Furthermore, virtually every new vehicle manufactured today comes equipped with a multitude of electronic equipment.

Typically, one or more of these electronic devices are wired into the vehicle's electrical system so that the devices may be powered by the vehicle's battery whether or not the vehicle's engine is running. If, however, the engine is not running, the vehicle's battery is not being charged by the vehicle's charging system. This means that the vehicle's battery will be discharging if the electronic devices are operated while the vehicle's engine is not running. In addition, the vehicle's charging system may malfunction such that, even with the engine running, the vehicle's battery will be discharging while the electronic devices are being operated.

Many times these electronic devices utilize the vehicle's battery power even when they are turned off. For example, some of the electronic devices maintain data in memory chips which must remain powered to continue storing the data. Other devices have clocks, status lights, etc. which are constantly powered by the vehicle's battery. Thus, discharging of the vehicle's battery occurs even when these devices are turned off.

A few electronic devices, such as vehicle theft alarm systems, are intended to be primarily operated by the vehicle's battery when the engine is not running. In this case, the vehicle's owner will actually turn the device on when the engine is not running, knowing that the device will be operating solely on power supplied by the vehicle's battery.

On a Class 8 vehicle equipped with a satellite system and/or a sleeper unit, the satellite system will usually be left on by the vehicle's operator at all times. Additionally, the operator may fall asleep while watching television and resting in the sleeper unit during a mandatory rest period.

And finally, electronic devices are frequently left turned on by the vehicle's owner inadvertently. For example, a radar detector, typically receiving power through the vehicle's cigarette lighter receptacle, may be left on when the driver reaches a destination, turns the vehicle's engine off, and exits the vehicle. Since cigarette lighter receptacles usually remain connected to the vehicle's battery when the engine is not running, the radar detector will be discharging the battery.

The problem of vehicle battery discharging due to operation of electronic devices is compounded by the fact that large voltage spikes are created in a vehicle's electrical system when the engine is started. These voltage spikes are even larger when the vehicle's battery has been significantly discharged. Thus, electronic devices connected to the vehicle's electrical system are in danger of damage from voltage spikes when the vehicle's engine is being started, and this danger is greater when the vehicle's battery has been significantly discharged.

Solutions have been proposed to the problems associated with electronic devices discharging the vehicle's battery and being damaged when the engine is started. One solution has been to interconnect a switch between the vehicle's electrical system and an electronic device. The switch is turned off by a detecting circuit when the engine is not running. The detecting circuit senses whether or not the engine is running by monitoring the "noise" in the vehicle's electrical system which is present when the engine is running. If "noise" is present, the detecting circuit turns the switch off, thereby disconnecting the electronic device from the vehicle's electrical system.

This solution has several disadvantages, however. One disadvantage is that a switch and detecting circuit must be used for each electronic device installed in the vehicle. Another disadvantage is that "noise", a potentially harmful quality for an electronic device, is the very thing that allows the electronic device to receive power. Yet another disadvantage of this solution is that it does not solve the problem of discharge of the vehicle's battery when the engine is running.

Another solution which has been proposed is to provide a second power source, such as a second battery, exclusively for noise-sensitive electronic devices. The second battery is charged by the vehicle's normal battery when the voltage in the second battery falls below a predetermined voltage. During operation of the electronic devices, the second battery is the exclusive power source for the electronic devices.

However, this solution also has several disadvantages. One such disadvantage is that the electronic devices may completely discharge the second battery if the vehicle's engine is not running. Another disadvantage is that the operator must turn off the electronic devices in order for the second battery to be charged by the normal battery. Furthermore, the second battery may discharge the normal battery if, for example, the second battery develops a bad cell or a short therein.

Various other solutions have been proposed, each of which solve only a portion of the problems associated with powering and protecting electronic devices installed in vehicles. Unfortunately, most if not all of these solutions thereby create additional problems and inconveniences which make them undesirable.

Additionally, applicant is not aware of any existing solutions which also provide a warning to the vehicle's operator that the battery is being discharged below an acceptable level. Such a warning would be useful to the operator. It would enable the operator to turn off electronic devices and thereby conserve the remaining battery charge level. It would also signal to the operator that there may be a malfunction in the vehicle's charging circuit.

From the foregoing, it can be seen that it would be quite desirable to provide an apparatus which protects electronic devices from voltage spikes while starting a vehicle's engine, prevents discharge of the vehicle's battery whether or not the engine is running, and provides a warning to the operator that the battery is being discharged below an acceptable level. It is accordingly an object of the present invention to provide such an apparatus and associated methods of manufacturing.

SUMMARY OF THE INVENTION

In carrying out the principles of the present invention, in accordance with an embodiment thereof, an apparatus for protecting electronic devices is provided. Electronic devices installed in a vehicle are protected by preventing unacceptable discharge of the vehicle's battery, isolating the electronic devices from the vehicle's electrical system while the vehicle's engine is being started, and warning the vehicle's operator when the battery voltage falls below an acceptable level. Associated methods of manufacturing the apparatus are also provided.

In broad terms, a circuit for protecting an electronic device operatively installed in a vehicle and connected to a battery therein from voltage spikes and surges produced when the vehicle is started, and for preventing the electronic device from discharging the battery below an acceptable level is provided, the circuit including first means for determining when the battery has been discharged below a first voltage level, first means connected to the first determining means for disconnecting the battery from the electronic device when the battery has been discharged below the first voltage level, means for sensing when the vehicle is being started, second means connected to the sensing means for disconnecting the electronic device from the battery when the vehicle is being started, second means for determining when the battery is being charged above a second voltage level, means for reconnecting the electronic device to the battery, after the electronic device has been previously disconnected from the battery by the first disconnecting means, when the second determining means indicates the battery is being charged above the second voltage level, and second means for reconnecting the electronic device to the battery, after the electronic device has been previously disconnected from the battery by the second disconnecting means, when the sensing means indicates the vehicle is not being started.

A method of manufacturing a circuit for protecting an electronic device installed in a vehicle and connected to a battery in the vehicle from voltage anomalies resulting from starting the vehicle, and for preventing the electronic device from discharging the battery below a first acceptable level is also provided, which method includes the steps of providing first means for determining when the battery has been discharged below a first voltage level, connecting the first determining means to the battery, providing first means for disconnecting the vehicle battery from the electronic device when the battery has been discharged below the first voltage level, connecting the first disconnecting means to the first determining means, and intermediate the battery and the electronic device, providing means for sensing when the vehicle is being started, connecting the sensing means to the vehicle, providing second means for disconnecting the electronic device from the battery when the vehicle is being started, connecting the second disconnecting means to the sensing means and intermediate the battery and the electronic device, providing second determining means for determining when the battery is being charged above a second voltage level, connecting the second determining means to the battery, providing first means for reconnecting the electronic device to the battery, after the electronic device has been previously disconnected from the battery by the first disconnecting means, when the second determining means indicates the battery is being charged above the second voltage level, connecting the first reconnecting means to the battery and the first disconnecting means, providing second means for reconnecting the electronic device to the battery, after the electronic device has been previously disconnected from the battery by the second disconnecting means, when the sensing means indicates the vehicle is not being started, and connecting the second reconnecting means to the second disconnecting means.

The use of the disclosed apparatus and associated methods will permit vehicle owners to more conveniently utilize electronic devices in their vehicles. The electronic devices are prevented from overly discharging the vehicle's battery, and the vehicle's electrical system is prevented from damaging the electronic devices during engine starting. In addition, a warning is given to the operator that the battery is being unacceptably discharged so that remedial measures may be taken.

DETAILED DESCRIPTION

Figure 1:
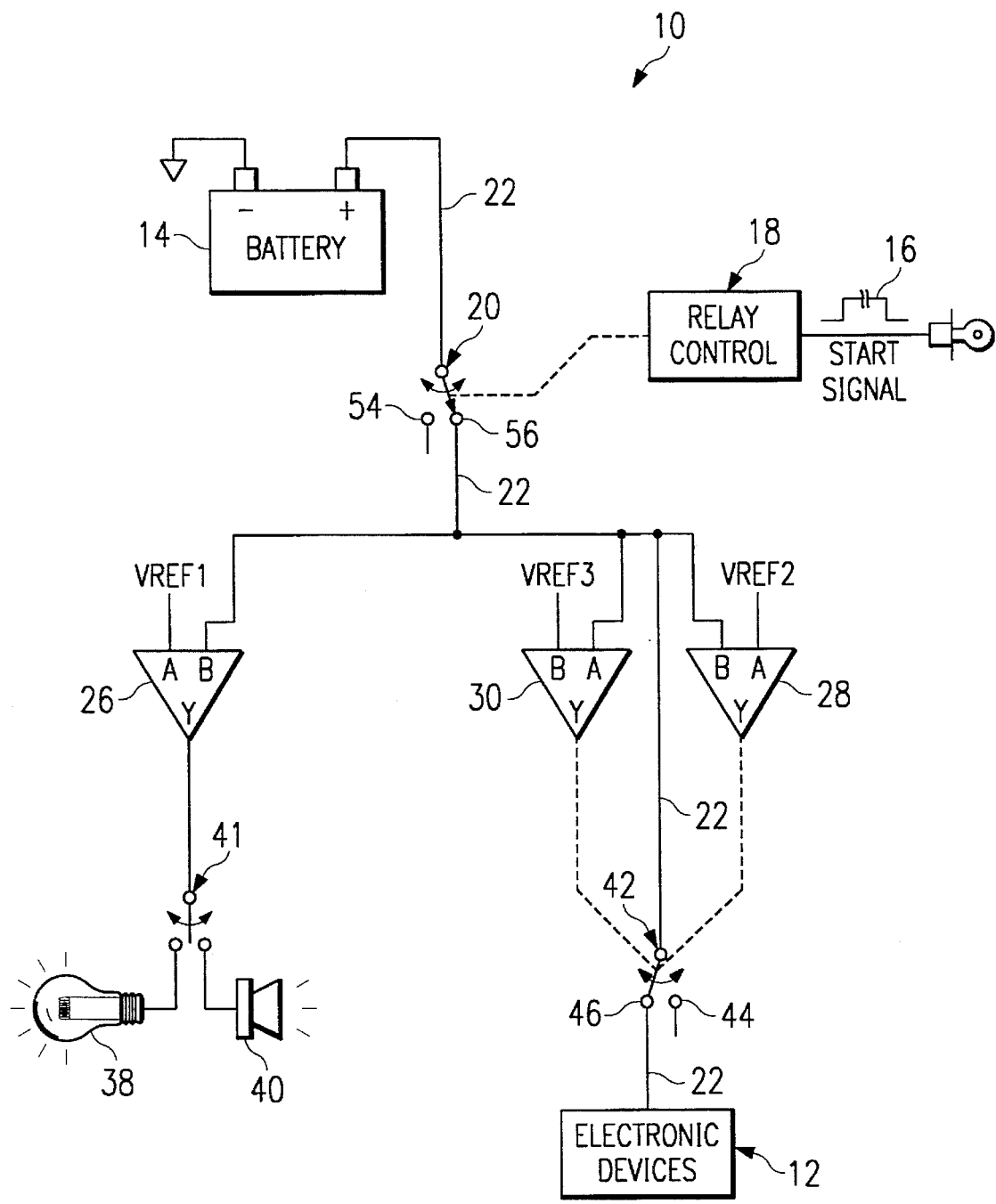
FIG. 1 is a simplified block diagram of an electronic device protecting apparatus embodying principles of the present invention.

Illustrated in FIG. 1 is an apparatus 10 for protecting electronic devices, which apparatus embodies principles of the present invention. Electronic devices 12 installed in a vehicle (not shown) are disconnected and reconnected to the vehicle's battery 14 in a unique manner which protects the electronic devices from spikes and surges which occur during starting of the vehicle's engine, and prevents the electronic devices from draining the battery 14 to an unacceptably low voltage.

When the vehicle is started a start signal 16 is produced. The start signal 16 is received by a relay controller 18 which controls the activation of a relay 20 situated in a power line 22 connecting the electronic devices 12 to the battery 14. The relay 20 is normally closed. Relay controller 18 opens the relay 20 when it receives the start signal 16, thus disconnecting the electronic devices 12 from the battery 14.

Relay controller 18 opens the relay 20 for the duration of the start signal 16 and, in addition, maintains the relay 20 open for a predetermined period of time after the start signal has discontinued. The delay period assures that the vehicle has reached a steady state before the electronic devices 12 are reconnected to the battery 14. While the relay 20 is open, the electronic devices 12 are powered by a second battery 24, commonly referred to as an isolation battery, which is not shown in FIG. 1, but is described hereinbelow in relation to the detailed circuit diagram illustrated in FIG. 2.

First, second, and third comparators 26, 27, and 28 are connected to the power line 22 between the battery 14 and the electronic devices 12. These comparators 26,28,30 are of conventional design and are used in the apparatus 10 to compare the voltage in the power line 22 to respective predetermined reference voltages VREF1, VREF2, and VREF3. The comparators 26,28,30 are of a type that have three terminals—A, B, and Y—such that when the voltage on terminal A exceeds the voltage on terminal B, a voltage is produced on terminal Y. Conversely, when the voltage on terminal B exceeds the voltage on terminal A, no voltage is produced on terminal Y (terminal Y is effectively grounded).

Warning comparator 26 is connected at its terminal B to power line 22. Terminal A of warning comparator 26 is connected to a predetermined reference voltage VREF1. Thus, when the voltage in the power line 22 drops below VREF1, a voltage is produced at terminal Y of warning comparator 26.

The function of warning comparator 26 is to warn the vehicle's operator when the battery 14 has been discharged below an acceptable level (the voltage set as VREF1). The voltage at terminal Y of warning comparator 26 may be selectively directed to a visible indicator, such as light 38, or an audible indicator, such as speaker 40, by means of a selector switch 41.

Disconnect comparator 28 is connected at its terminal B to power line 22, and at its terminal A to a predetermined reference voltage VREF2. Thus, when the voltage in the power line 22 drops below VREF2, a voltage is produced at terminal Y of disconnect comparator 28. The voltage produced at terminal Y of disconnect comparator 28 is used to control a latching switch 42 in the power line 22 between the disconnect comparator and the electronic devices 12.

The purpose of disconnect comparator 28 is to disconnect the electronic devices 12 from the battery 14 before the battery is discharged below VREF2. This ensures that the battery 14 will not be discharged below a voltage needed to start the vehicle. VREF2 is set at a somewhat lower voltage than VREF1. Thus, the operator of the vehicle is first warned that the battery 14 is being overly discharged by means of the warning comparator 26, and then, if sufficient remedial measures are not taken and the battery discharges further, disconnect comparator 28 removes the load of the electronic devices 12 from the battery to prevent further discharge.

It is important to understand that latching switch 42, controlled, at least in part, by the voltage at terminal Y of disconnect comparator 28 will latch to its off position 44 when a voltage exists at terminal Y of the disconnect comparator, but will not latch to its on position 46 when the voltage is subsequently removed from terminal Y of the disconnect comparator. It remains "latched" in the off position 44 even when the stimulus that turned it off is removed (that is, when the voltage in power line 22 again exceeds VREF2). Thus, if the battery 14 has been discharged below VREF2 such that disconnect comparator 28 activates the latching switch 42 to its off position 44, the disconnect comparator will not subsequently activate the latching switch to its on position 46 when the voltage in the power line 22 again exceeds VREF2 (for example, when the vehicle has been started and its alternator is supplying power sufficient to charge the battery and operate the electronic devices 12).

Reconnect comparator 30 is connected at its terminal A to the power line 22, and at its terminal B to a predetermined reference voltage VREF3. When the voltage in the power line 22 exceeds VREF3, a voltage is produced at terminal Y of reconnect comparator 30. The voltage produced at terminal Y of reconnect comparator 30 is used to control the latching switch 42 in a manner similar to that described above in regard to the disconnect comparator 28, but in reverse. When a voltage is produced at terminal Y of reconnect comparator 30, latching switch 42 is activated to its on position 46.

VREF3 is set at a voltage which is high enough to indicate that, for example, the vehicle's alternator is supplying sufficient power to charge the battery 14 and operate the electronic devices 12, or a new battery has been installed. Thus, VREF3 is set at a voltage greater than VREF2 or VREF1. The purpose of reconnect comparator 30 is to reconnect the electronic devices 12 to the battery 14 when, the battery having previously been disconnected from the electronic devices due to unacceptable discharging, the battery is again charged to an acceptable level or the vehicle's alternator is producing power sufficiently.

Preferred voltages for VREF1, VREF2, and VREF3 have been determined by the applicant to be approximately 12.5, 12.2, and 13.8 volts, respectively, for a nominal 12 volt vehicle electrical system. These voltages may be varied without departing from the principles of the present invention.

Thus, using the above-identified preferred voltages, an exemplary operational sequence of the apparatus 10 would be as follows:

1. With the vehicle turned off and electronic devices 12 being operated, battery 14 has a voltage of approximately 13 volts, switch 20 is closed, and latching switch 42 is closed;
2. The battery 14 is being discharged to an unacceptably low voltage; the voltage in power line 22 approaches 12.5 volts;
3. When the voltage in power line 22 falls below 12.5 volts, warning comparator 26 activates a visible or audible alarm 38 or 40;
4. If no measures are taken to prevent further discharge of the battery 14, the voltage in the power line 22 continues to drop and approaches 12.2 volts;
5. When the voltage in power line 22 falls below 12.2 volts, disconnect comparator 28 activates latching switch 42 to its open position 44, thereby removing the load of the electronic devices 12 from the battery 14;
6. When the voltage in the power line 22 next exceeds 13.8 volts, such as when the vehicle has been started and its alternator is operating or the battery 14 has been replaced or recharged, reconnect comparator 30 activates latching switch 42 to its on position 46, thereby reconnecting the electronic devices 12 to the battery 14.

Figure 2:
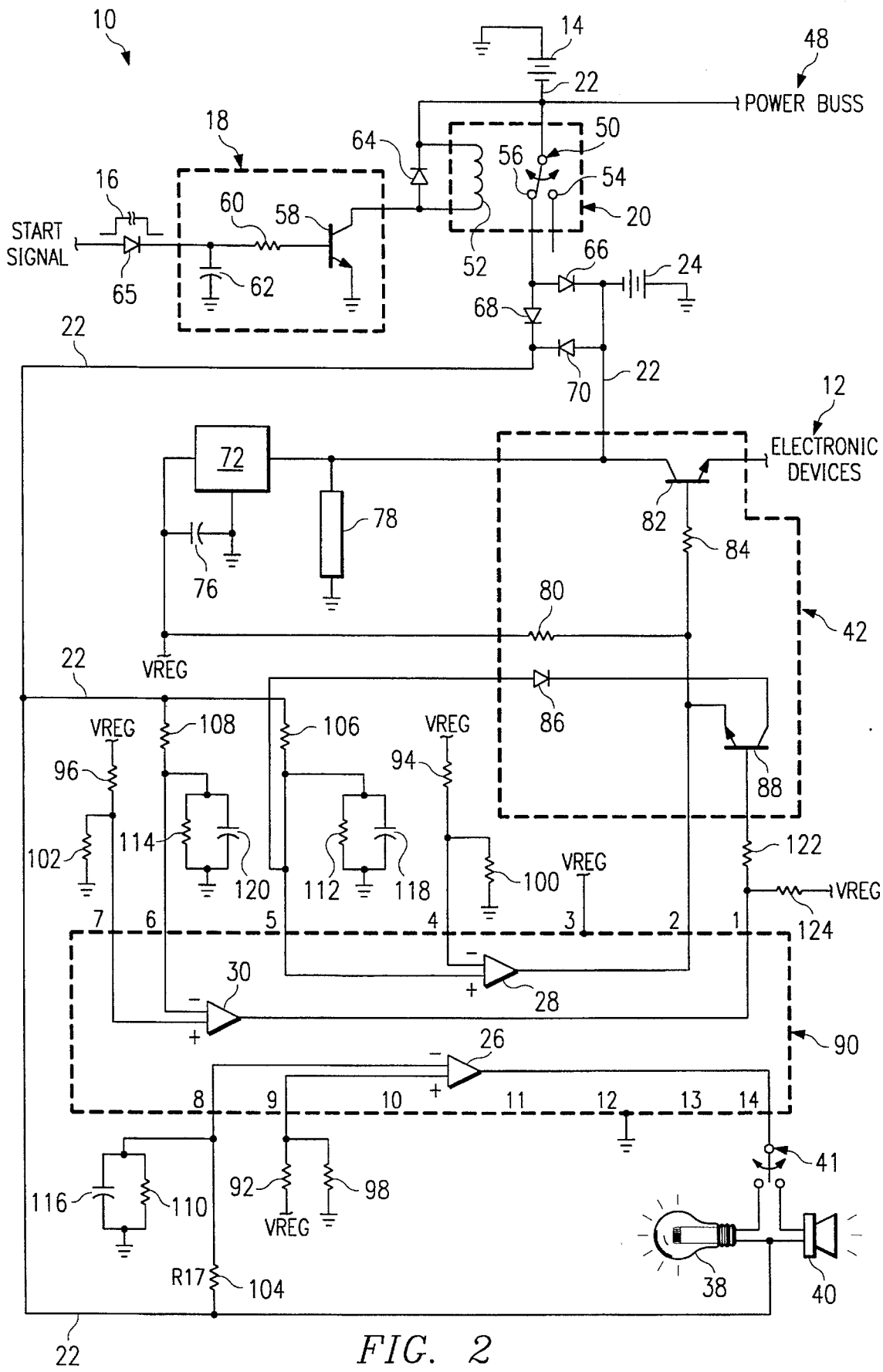
FIG. 2 is a schematic circuit diagram, illustrating in detail the component parts thereof.

Turning now to FIG. 2, a detailed circuit diagram of the apparatus 10 is illustrated, showing the individual components of a preferred embodiment of the present invention. The apparatus 10 is interconnected to the vehicle's electrical system by connecting the vehicle's power buss 48 (representing all of the power-consuming equipment not protected by the apparatus, and the point of connection of the vehicle's power-generating alternator) to the power line 22 between the battery 14 and the relay 20. In this manner, the vehicle's power buss 48 may discharge and/or charge the battery 14 as in conventional vehicle electrical systems.

The relay 20 is of conventional construction and includes a normally-closed switch 50 and a coil 52. When the switch 50 is in its closed position 56, the battery 14 is connected to the power line 22 on the other side of the relay 20. When the coil 52 is energized, the switch 50 is activated to its open position 54, thereby isolating the electronic devices 12 from the battery 14 and the power buss 48.

The coil 52 is energized when a start signal 16 originating at the vehicle's starter is received by the relay controller 18. Diode 65 ensures that current from the relay controller 18 cannot pass back to the vehicle's starter. The relay controller 18 includes a transistor 58 connected at its emitter terminal to ground and at its collector terminal to the relay coil 52, a resistor 60, and a capacitor 62 connected to ground.

When the start signal 16 is received at the base terminal of transistor 58, the relay coil 52 is energized, activating switch 50 to its open position 54. A steering diode 64 ensures that current can only pass through the coil 52 to ground through transistor 58. When the start signal 16 is no longer being received, capacitor 62 maintains a voltage on the base terminal of the transistor 58 for a predetermined delay period. Applicant's preferred delay period is approximately ten seconds.

With the relay switch 50 in its closed position 56, current passes from the battery 14 through the relay 20 to a set of three diodes 66,68,70. Diodes 68 and 70 are steering diodes, and diode 66 is a high current diode. Diodes 66 and 68 prevent any current from passing back to the battery 14 or power buss 48. In this way, a discharged or shorted battery 14, or equipment operated by the power buss 48, cannot discharge the isolation battery 24 whose purpose is to provide power to the electronic devices 12 when the relay 20 is open. Diode 70 permits current from the isolation battery 24 to pass to the power line 22.

A regulated power supply 72 of conventional construction is connected to the power line 22 and produces a constant, regulated voltage VREG. Applicant's preferred regulated voltage VREG is five volts. A capacitor 76 and transorb 78 filter noise from VREG and the power line 22, respectively. A resistor 80 connects VREG to the latching switch 42.

The latching switch 42 operates to permit connecting and disconnecting of the power line 22 to the electronic devices 12 as described hereinabove in the description regarding FIG. 1. Latching switch 42 includes a power transistor 82, a resistor 84, a steering diode 86, and a latching transistor 88. When sufficient voltage is present at the base terminal of power transistor 82, its collector terminal, which is connected to the power line 22, is connected to its emitter terminal, which, in turn, is connected to the electronic devices 12. Thus, when sufficient voltage is present at the power transistor 82 base terminal, battery 14 (or isolation battery 24 if relay 20 is open) is connected to the electronic devices 12. Latching transistor 88 ensures that, when the sufficient voltage is no longer present at the power transistor 82 base terminal (due to voltage in the power line 22 falling below predetermined voltage VREF2), the sufficient voltage will not reach the power transistor 82 base terminal until the voltage in the power line 22 reaches predetermined voltage VREF3 (see FIG. 1), thereby "latching" the power transistor 82. The manner in which latching transistor 88 acts to latch the power transistor 82 will be clear upon consideration of the further description of the circuit diagram hereinbelow.

An integrated circuit 90 having terminals numbered 1 through 14 contains at least three comparators 26,28,30, as described hereinabove in the description of the block diagram illustrated in FIG. 1. Power for operation of the integrated circuit 90 is supplied from VREG to pin 3, and a ground connection is provided at pin 12. The A terminals of these comparators 26,28,30 are identified in FIG. 2 by the "+" symbol, and the B terminals are identified by the "–" symbol.

Note that VREG is connected to one of the terminals of each comparator 26,28,30 through resistors 92,94,96,98,100,102 to produce predetermined reference voltages VREF1, VREF2, and VREF3 at pins 9, 4, and 7, respectively, of integrated circuit 90. Thus, resistors 92,94,96,98,100,102 function to divide VREG into voltages VREF1, VREF2, and VREF3.

Power line 22 is also connected to one terminal of each of the comparators 26,28,30. The voltage in power line 22 is connected to pins 8, 5, and 6 of integrated circuit 90 through resistors 104,106,108,110,112,114 and capacitors 116,118,120. Resistors 104,106,108,110,112,114 function to divide the voltage in power line 22 for comparison to voltages VREF1, VREF2, and VREF3 by comparators 26, 28, and 30, respectively. Capacitors 116,118,120 function to provide a predetermined delay between the time a change in voltage appears in power line 22 and the changed voltage is compared by the comparators 26,28,30. Applicant's preferred delay time is approximately one second.

Applicant's preferred predetermined voltages for VREF1, VREF2, and VREF3 were disclosed hereinabove to be approximately 12.5, 12.2, and 13.8 volts, respectively. The corresponding divided voltages at pins 9, 4, and 7 of integrated circuit 90 are approximately 2.99, 2.89, and 3.40 volts, respectively. Thus, when the voltage at pin 8 of integrated circuit 90 drops to approximately 2.99 volts, corresponding to a voltage in power line 22 of approximately 12.5 volts, a voltage is produced at pin 14 of integrated circuit 90 by comparator 26, turning on light 38 or speaker 40 to warn the vehicle's operator. When the voltage at pin 5 of integrated circuit 90 drops to approximately 2.89 volts, corresponding to a voltage in power line 22 of approximately 12.2 volts, the voltage at pin 2 of integrated circuit 90 goes low.

Since pin 2 of integrated circuit 90 is connected to the base terminal of power transistor 82, when the voltage at pin 2 goes low, power transistor 82 turns "off", thereby disconnecting the electronic devices from the power line 22. Note also, that pin 2 of integrated circuit 90 is connected to the emitter terminal of latching transistor 88, and the collector terminal of the latching transistor is connected to pin 5 of integrated circuit 90 (the pin having the voltage being compared to VREF2). Thus, as long as latching transistor 88 is "on" and providing a conductive path from pin 5 to pin 2 of integrated circuit 90, through diode 86, comparator 28 will continue to "see" a low voltage at pin 5 and will maintain power transistor 82 "off". This is the manner in which latching transistor 88 "latches" power transistor 82.

Latching transistor 88 remains "on" as long as a sufficient voltage is present at its base terminal. Voltage is supplied to latching transistor 88 through resistors 122,124 from VREG and reconnect comparator 30. Reconnect comparator 30 maintains a voltage at pin 1 of integrated circuit 90 as long as the voltage at pin 6 is less than approximately 3.40 volts, corresponding to a voltage in the power line 22 of approximately 13.8 volts (VREF3). Thus latching transistor 88 remains "on" keeping power transistor 82 "off", until the voltage in power line 22 exceeds approximately 13.8 volts, at which time the latching transistor turns "off" and the power transistor turns "on", thereby reconnecting the electronic devices to the power line 22.

Applicant's preferred specifications for the individual components shown in FIG. 2 are as follows:

Relay 20-30 amp;

Diode 66-15 amp;

Power transistor 82-ECG2396;

Transorb 78-ECG1V017;

Transistor 58-TIP120;

Latching transistor 88-2N2222A;

Regulated power source 72-5 volt regulator;

Diodes 64,65,68,70,86-1 amp;

Resistor 84-1KΩ, 1/4W, 1%;

Resistor 60-5KΩ, 1/4W, 1%;

Resistors 80,122-2KΩ, 1/4W, 1%;

Resistors 108,106,104,124-10KΩ, 1/4W, 1%;

Resistors 114,112,110-3.3KΩ, 1/4W, 1%;

Resistor 102-7.68KΩ, 1/4W, 1%;

Resistors 96,94,92-4.02KΩ, 1/4W, 1%;

Resistor 100-4.99KΩ, 1/4W, 1%;

Resistor 98-5.49KΩ, 1/4W, 1%;

Capacitors 76,116,118,120-220 µF @ 16 V;

Capacitor 62-1000 µF @ 16 V;

Integrated circuit 90-LM239N;

Isolation battery 24-able to supply 15 amps for 5 min.

The foregoing detailed description is to be clearly understood as being given by way of illustration and example only, the spirit and scope of the present invention being limited solely by the appended claims.

What is claimed is:

1. A circuit for protecting an electronic device operatively installed in a vehicle from voltage spikes and surges produced when the vehicle is started, the vehicle having an electrical system which connects the electronic device to a battery included in the electrical system, and for preventing the electronic device from discharging the battery below an acceptable level, the circuit comprising:

first determining means for determining when the battery has been discharged below a first voltage level;

first disconnecting means, connected to said determining means, for disconnecting the electronic device from the electrical system when the battery has been discharged below said first voltage level, the remainder of the electrical system remaining connected to the battery;

sensing means for sensing when the vehicle is being started;

second disconnecting means, connected to said sensing means, for disconnecting the electronic device from the electrical system when the vehicle is being started;

second determining means for determining when the battery is being charged above a second voltage level;

first reconnecting means for reconnecting the electronic device to the electrical system, after the electronic device has been previously disconnected from the electrical system by said first disconnecting means, when said second determining means indicates the battery is being charged above said second voltage level; and second reconnecting means for reconnecting the electronic device to the electrical system, after the electronic device has been previously disconnected from the electrical system by said second disconnecting means, when said sensing means indicates the vehicle is not being started.

2. The circuit according to claim 1, wherein said first disconnecting means comprises a power transistor connected intermediate the electrical and the electronic device.

3. The circuit according to claim 1, wherein said second disconnecting means comprises a relay connected intermediate the electrical system and the electronic device.

4. The circuit according to claim 1 further comprising:

third determining means for determining when the battery has been discharged below a third voltage level, said third voltage level higher than said first voltage level; and warning means, connected to said third determining means, for warning an operator of the vehicle that the battery has been discharged below said third voltage level and that remedial action is necessary to prevent disconnection of the electronic device from the electrical system.

5. The circuit according to claim 4, wherein said warning means comprises an audible signal, a visible signal, and switch means for permitting said operator to select from among said audible signal and said visible signal.

6. The circuit according to claim 1, further comprising a voltage reference source connected to the electrical system.

7. The circuit according to claim 6, wherein said first determining means comprises a first comparator connected to said voltage reference source, the electrical system, and said first disconnecting means.

8. The circuit according to claim 6, further comprising:

third determining means for determining when the battery has been discharged below a third voltage level, said third voltage level higher than said first voltage level, said third determining means including a second comparator connected to said voltage reference source and the electrical system; and warning means, connected to said third determining means, for warning an operator of the vehicle that the battery has been discharged below said third voltage level and that remedial action is necessary to prevent disconnection of the electrical device from the electrical system.

9. Apparatus for protecting an electronic device installed in a vehicle, the vehicle having an engine and an electrical system for supplying voltage to operate the electronic device, the electrical system including a battery having a first voltage, an alternator capable of being driven by the engine and producing a second voltage when being driven by the engine, and a charging circuit for charging the battery with the second voltage produced by the alternator, the electrical system further having a first state in which the engine is not running, a second state in which the engine is being started, and a third state in which the engine is running, and an operator of the vehicle selecting from among the first, second, and third states, the apparatus comprising:

power transistor means for electrically connecting and disconnecting the electronic device from the electrical system;

reference voltage means, connected to the electrical system, for producing a constant reference voltage from the first voltage, said reference voltage being less than the first voltage;

first comparator means, connected to the electrical system and said reference voltage means, for comparing the first voltage to said reference voltage and activating said power transistor means to disconnect the electronic device from the electrical system when the first voltage is less than said first predetermined voltage;

warning means for warning the operator that remedial action is necessary to prevent disconnection of the electronic device from the electrical system, said warning means issuing a warning when the first voltage is less than a second predetermined voltage, said second predetermined voltage being greater than said first predetermined voltage;

second comparator means, connected to the electrical system and said reference voltage means, for activating said warning means when the first voltage is less than said second predetermined voltage;

third comparator means, connected to the electrical system and said reference voltage means, for activating said power transistor means to connect the electronic device the electrical system when the alternator is producing the second voltage, the electrical system being in the third state;

sensing means for sensing when the electrical system is in the second state; and relay means, connected to said sensing means, for disconnecting the electronic device from the electrical system when the electrical system is in the second state.

10. The apparatus according to claim 9, further comprising secondary battery means for supplying power to the electronic device when said relay means disconnects the electronic device from the electrical system.

11. The apparatus according to claim 9, further comprising first time delay means connected to said relay means for continuing to disconnect the electronic device from the electrical system for a predetermined period of time after the electrical system is no longer in the second state.

12. The apparatus according to claim 9, further comprising an integrated circuit which includes said first, second, and third comparator means.

13. The apparatus according to claim 9, wherein said warning means comprises an audible signal, a visible signal, and switch means for permitting the operator to select from among said audible signal and said visible signal.

14. For a vehicle having an electrical system which includes a battery, a method of manufacturing a circuit for protecting an electronic device installed in a vehicle and connected to the electrical system of the vehicle from voltage anomalies resulting from starting the vehicle, and for preventing the electronic device from discharging the battery below a first acceptable level, the method comprising the steps of:

provided first determining means for determining when the battery has been discharged below a first voltage level;

connecting said first determining means to the electrical system;

providing first disconnecting means for disconnecting the the electronic device from the electrical system when the battery has been discharged below said first voltage level;

connecting said first disconnecting means to said first determining means, and intermediate the electrical system and the electronic device;

providing sensing means for sensing when the vehicle is being started;

connecting said sensing means to the vehicle;

providing second disconnecting means for disconnecting the electronic device from the electrical system when the vehicle is being started;

connecting said second disconnecting means to said sensing means and intermediate the electrical system and the electronic device;

providing second determining means for determining when the battery is being charged above a second voltage level;

connecting said second determining means to the electrical system;

providing first reconnecting means for reconnecting the electronic device to the electrical system, after the electronic device has been previously disconnected from the electrical system by said first disconnecting means, when said second determining means indicates the battery is being charged above said second voltage level;

connecting said first reconnecting means to the electrical system and said first disconnecting means;

providing second reconnecting means for reconnecting the electronic device to the electrical system, after the electronic device has been previously disconnected from the electrical system by said second disconnecting means, when said sensing means indicates the vehicle is not being started; and connecting said second reconnecting means to said second disconnecting means.

15. The method according to claim 14, wherein said step of providing first disconnecting means comprises providing a power transistor connected intermediate the electrical system and the electronic device.

16. The method according to claim 14, wherein said step of providing second disconnecting means comprises providing a relay connected intermediate the electrical system and the electronic device.

17. The method according to claim 14 further comprising the steps of:

providing third determining means for determining when the battery has been discharged below a third voltage level;

connecting said third determining means to the electrical system;

providing warning means for warning an operator of the vehicle that the battery has been discharged below said third voltage level and that remedial action is necessary to prevent disconnection of the electronic device from the electrical system; and connecting said warning means to said third determining means.

18. The method according to claim 17, wherein said step of providing warning means comprises providing an audible signal, a visible signal, and switch means for permitting the operator to select from among said audible signal and said visible signal.

19. The method according to claim 14, further comprising the steps of:

providing a voltage reference source; and connecting said voltage reference source to the electrical system.

20. The method according to claim 19, wherein:

said step of providing first determining means comprises providing a first comparator; and further comprising the step of connecting said first comparator to said voltage reference source, the electrical system, and said first disconnecting means.

21. The method according to claim 19, further comprising the steps of:

providing third determining means for determining when the battery has been discharged below a third voltage level, said third determining means including a second comparator;

connecting said second comparator to said voltage reference source and the electrical system;

providing warning means for warning an operator of the vehicle that the battery has been discharged below said third voltage level and that remedial action is necessary to prevent disconnection of the electronic device from the electrical system; and connecting said warning means to said second comparator.

* * * * *